United States Patent
Choo et al.

(10) Patent No.: US 7,528,922 B2
(45) Date of Patent: May 5, 2009

(54) APPARATUS AND METHOD FOR MEASURING GROUND AMOUNTS OF LIQUID CRYSTAL DISPLAY PANEL

(75) Inventors: Hun-Jun Choo, Kyoungsangbuk-Do (KR); Deok-Hyun Kim, Chungcheongnam-Do (KR); Hwa-Seob Shim, Gyoungsangbuk-Do (KR); Jong-Go Lim, Gyoungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 1098 days.

(21) Appl. No.: 10/691,656

(22) Filed: Oct. 24, 2003

(65) Prior Publication Data
US 2005/0274167 A1    Dec. 15, 2005

(30) Foreign Application Priority Data
Dec. 17, 2002    (KR) .................. 10-2002-0080862

(51) Int. Cl.
*B24B 49/00*    (2006.01)
*G02F 1/13*    (2006.01)

(52) U.S. Cl. .......................................... 349/187; 451/6
(58) Field of Classification Search ................ 349/187; 451/6
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |

(Continued)

FOREIGN PATENT DOCUMENTS

CN    1364134    8/2002

(Continued)

*Primary Examiner*—Michael H Caley
(74) *Attorney, Agent, or Firm*—McKenna Long & Aldridge LLP

(57) ABSTRACT

An apparatus for measuring ground amounts of a liquid crystal display panel includes a grinding unit for grinding upper and lower marginal portions of a unit liquid crystal display panel, a first imaging system for producing images of a ground surface of the upper marginal portion of the unit liquid crystal display panel, and a second imaging system for producing images of a ground surface of the lower marginal portion of the unit liquid crystal display panel.

8 Claims, 4 Drawing Sheets

U.S. PATENT DOCUMENTS

| | | | |
|---|---|---|---|
| 5,952,676 A | 9/1999 | Sato et al. | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | Von Gutfeld et al. | |
| 6,163,357 A | 12/2000 | Nakamura | |
| 6,219,126 B1 | 4/2001 | Von Gutfeld | |
| 6,224,459 B1 * | 5/2001 | Stocker et al. | 451/5 |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,414,733 B1 | 7/2002 | Ishikawa et al. | |
| 6,428,390 B1 * | 8/2002 | Clark et al. | 451/11 |
| 2001/0021000 A1 | 9/2001 | Egami | |

FOREIGN PATENT DOCUMENTS

| | | |
|---|---|---|
| EP | 1 003 066 | 5/2000 |
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 06-054229 | 3/1987 |
| JP | 62-054225 | 3/1987 |
| JP | 62-054228 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-128315 | 5/1988 |
| JP | 63-311233 | 12/1988 |
| JP | 02-002946 | 1/1990 |
| JP | 02-062974 | 3/1990 |
| JP | 03-009549 | 1/1991 |
| JP | 03-22916 | 10/1991 |
| JP | 05-036425 | 2/1993 |
| JP | 05-036426 | 2/1993 |
| JP | 05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 06-018829 | 1/1994 |
| JP | 6-51256 | 2/1994 |
| JP | 06-064229 | 3/1994 |
| JP | 6-148657 | 5/1994 |
| JP | 6-160871 | 6/1994 |
| JP | 06-194637 | 7/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 07-275770 | 10/1995 |
| JP | 07-275771 | 10/1995 |
| JP | 08-076133 | 3/1996 |
| JP | 8-95066 | 4/1996 |
| JP | 8-101395 | 4/1996 |
| JP | 8-106101 | 4/1996 |
| JP | 08-110504 | 4/1996 |
| JP | 08-136937 | 5/1996 |
| JP | 8-171094 | 7/1996 |
| JP | 08-173874 | 7/1996 |
| JP | 8-190099 | 7/1996 |
| JP | 8-240807 | 9/1996 |
| JP | 08-243891 | 9/1996 |
| JP | 09-001026 | 1/1997 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 09-094500 | 4/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 63-110425 | 5/1998 |
| JP | 10-148619 | 6/1998 |
| JP | 10-174924 | 6/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-211799 | 8/1999 |
| JP | 11-212045 | 8/1999 |
| JP | 11-248930 | 9/1999 |
| JP | 11-262712 | 9/1999 |
| JP | 11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-180808 | 6/2000 |
| JP | 2000180808 A * | 6/2000 |
| JP | 2000-193988 | 7/2000 |
| JP | 2000-202749 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-083492 | 3/2001 |
| JP | 2001-91727 | 4/2001 |
| JP | 2001-117105 | 4/2001 |
| JP | 2001-117109 | 4/2001 |

| | | | | | | |
|---|---|---|---|---|---|---|
| JP | 2001-133745 | 5/2001 | | JP | 2002-122870 | 4/2002 |
| JP | 2001-133794 | 5/2001 | | JP | 2002-122872 | 4/2002 |
| JP | 2001-133799 | 5/2001 | | JP | 2002-122873 | 4/2002 |
| JP | 2001-135910 | 5/2001 | | JP | 2002-131762 | 5/2002 |
| JP | 2001-142074 | 5/2001 | | JP | 2002-139734 | 5/2002 |
| JP | 2001-147437 | 5/2001 | | JP | 2002-156518 | 5/2002 |
| JP | 2001-154211 | 6/2001 | | JP | 2002-169166 | 6/2002 |
| JP | 2001-166272 | 6/2001 | | JP | 2002-169167 | 6/2002 |
| JP | 2001-166310 | 6/2001 | | JP | 2002-182222 | 6/2002 |
| JP | 2001-183683 | 7/2001 | | JP | 2002-202512 | 7/2002 |
| JP | 2001-201750 | 7/2001 | | JP | 2002-202514 | 7/2002 |
| JP | 2001-209052 | 8/2001 | | JP | 2002-214626 | 7/2002 |
| JP | 2001-209056 | 8/2001 | | JP | 2002-229042 | 8/2002 |
| JP | 2001-209057 | 8/2001 | | JP | 2002-236276 | 8/2002 |
| JP | 2001-209058 | 8/2001 | | JP | 2002-258299 | 8/2002 |
| JP | 2001-209060 | 8/2001 | | JP | 2002-236292 | 9/2002 |
| JP | 2001-215459 | 8/2001 | | JP | 2002-277865 | 9/2002 |
| JP | 2001-222017 | 8/2001 | | JP | 2002-277866 | 9/2002 |
| JP | 2001-235758 | 8/2001 | | JP | 2002-277881 | 9/2002 |
| JP | 2001-255542 | 9/2001 | | JP | 2002-287156 | 10/2002 |
| JP | 2001-264782 | 9/2001 | | JP | 2002-296605 | 10/2002 |
| JP | 2001-272640 | 10/2001 | | JP | 2002-311438 | 10/2002 |
| JP | 2001-281675 | 10/2001 | | JP | 2002-311440 | 10/2002 |
| JP | 2001-281678 | 10/2001 | | JP | 2002-311442 | 10/2002 |
| JP | 2001-282126 | 10/2001 | | JP | 2002-323687 | 11/2002 |
| JP | 2001-305563 | 10/2001 | | JP | 2002-323694 | 11/2002 |
| JP | 2001-330837 | 11/2001 | | JP | 2002-333628 | 11/2002 |
| JP | 2001-330840 | 11/2001 | | JP | 2002-333635 | 11/2002 |
| JP | 2001-356353 | 12/2001 | | JP | 2002-333843 | 11/2002 |
| JP | 2001-356354 | 12/2001 | | JP | 2002-341329 | 11/2002 |
| JP | 2002-14360 | 1/2002 | | JP | 2002-341355 | 11/2002 |
| JP | 2002-23176 | 1/2002 | | JP | 2002-341356 | 11/2002 |
| JP | 2002-49045 | 2/2002 | | JP | 2002-341357 | 11/2002 |
| JP | 2002-079160 | 3/2002 | | JP | 2002-341358 | 11/2002 |
| JP | 2002-080321 | 3/2002 | | JP | 2002-341359 | 11/2002 |
| JP | 2002-082334 | 3/2002 | | JP | 2002-341362 | 11/2002 |
| JP | 2002-82340 | 3/2002 | | KR | 10-149715 | 6/1998 |
| JP | 2002-90759 | 3/2002 | | KR | 2000-0035302 | 6/2000 |
| JP | 2002-90760 | 3/2002 | | | | |
| JP | 2002-107740 | 4/2002 | | | | |

* cited by examiner

APPARATUS AND METHOD FOR MEASURING GROUND AMOUNTS OF LIQUID CRYSTAL DISPLAY PANEL

The present invention claims the benefit of Korean Patent Application No. P2002-080862 filed in Korea on Dec. 17, 2002, which is hereby incorporated by reference.

BACKGROUND OF THE INVENTION

1. Field of the Invention

The present invention relates to an apparatus and method for measuring ground amounts of a display panel, and more particularly, to an apparatus and method for measuring ground amounts of a liquid crystal display panel.

2. Disclosure of the Related Art

In general, a plurality of thin film transistor array substrates are formed on a first large-sized glass substrate and a plurality of color filter substrates are formed on a second large-sized glass substrate in order to improve fabrication yield of liquid crystal display devices. Then, the first and second substrates are attached together to simultaneously form a plurality of unit liquid crystal display panels. Accordingly, a process for cutting the liquid crystal display panel into a plurality of unit liquid crystal display panels is required.

The cutting of the unit crystal display panels is commonly performed such that a scribing line is formed on a surface of one of the first and second substrates using a wheel have a hardness greater than a hardness of the first and second glass substrates in order to propagate a crack along the scribing line.

FIG. 1 is a cross sectional view of a plurality of unit liquid crystal display panels according to the related art. In FIG. 1, a plurality of thin film transistor array substrates 1 protrude along sides of a plurality of color filter substrates 2. In addition, a gate pad unit (not shown) and a data pad unit (not shown) are formed along marginal portions of the thin film transistor array substrates 1 that do not overlap with the color filter substrates 2. Accordingly, the color filter substrates 2 are formed on a second substrate 30 and are isolated by dummy regions 31 corresponding to protruding portions of the thin film transistor array substrates 1 that are formed on a first substrate 20.

The unit liquid crystal display panels are suitably disposed such that an area of the first and the second substrates 20 and 30 may be efficiently utilized. In addition, the unit liquid crystal display panels are usually isolated by the regions 32.

After the first substrate 20, which includes the thin film transistor array substrates 1, and the second substrate 30, which includes the color filter substrates 2, are attached to each other, the liquid crystal display panels are cut into individual unit liquid crystal display panels. Accordingly, the dummy regions 31 and regions 32 are removed during cutting.

FIG. 2 is a plan view of a unit liquid crystal display panel according to the related art. In FIG. 2, a unit liquid crystal display panel 10 includes an image display unit 13 in which liquid crystal cells are arranged in a matrix form, a gate pad part 14 connecting gate lines (GL1 to GLm) of the image display unit 13 to a gate driver integrated circuit (not shown) to which a gate signal is supplied, and a data pad part 15 connecting data lines (DL1 to DLn) of the image display unit 13 to a data driver integrated circuit (not shown) to which image information is supplied. The gate pad part 14 and the data pad part 15 are formed along marginal portions of the thin film transistor array substrate 1 and protrude from a short side and a long side of the thin film transistor array substrate 1, as compared to the color filter substrate 2.

Although not shown, a thin film transistor switching the liquid crystal cells is formed at each of intersectional portions of the data lines DL1 to DLN and the gate lines GL1 to GLm of the thin film transistor array substrate 1. Furthermore, a pixel electrode is connected to the thin film transistor for supplying an electric field to the liquid crystal cells, and a passivation film is provided for protecting the data lines DL1 to DLn and the gate lines GL1 to GLm, wherein the thin film transistors and a pixel electrode are formed on the thin film transistor array substrate 1. In addition, color filters are separately coated at the cell regions by the black matrix and a common transparent electrode, which is a counter electrode of the pixel electrode formed on the thin film transistor array substrate 1, are provided on the color filter substrate 2.

A cell gap is formed between the thin film transistor array substrate 1 and the color filter substrate 2 so that they are separated with a gap formed there between. The thin film transistor array substrate 1 and the color filter substrate 2 are attached by a sealant (not shown) formed along an exterior of the image display unit 13, and a liquid crystal layer (not shown) is formed within the gap between the thin film transistor array substrate 1 and the color filter substrate 2.

Although not shown, a shorting bar is formed at the marginal portion of the thin film transistor array substrate 1 to prevent electrostatic discharge that may occur when conductive films are patterned on the thin film transistor array substrate 1. The shorting bar is removed after the liquid crystal display panels are cut to individual unit liquid crystal display panels. Thus, marginal portions of the unit liquid crystal display panel are ground to remove the shorting bar. In addition, grinding of the marginal portions of the unit liquid crystal display panel adversely causes generation of fragments within the marginal portion of the unit liquid crystal display panel due to exterior impact. Accordingly, an operator may be injured by the sharp fragments of the marginal portions of the unit liquid crystal display panel.

FIG. 3 is a schematic view of a grinding device for a liquid crystal display panel according to the related art. In FIG. 3, a grinding device includes a loading unit 50 that loads a cut unit liquid crystal display panel 10, a grinding unit 53 that receives the unit liquid crystal display panel 10 loaded at the loading unit 50, aligns the unit liquid crystal display panel 10 at a grinding table 51, and grinds a marginal portion of the unit liquid crystal display panel 10 using a grinding wheel 52 rotated at a high speed, and an unloading unit 54 that receives and unloads the ground unit liquid crystal display panel 10 from the grinding unit 53.

FIG. 4 is a perspective view of an apparatus for measuring a grinding amount of a liquid crystal display panel according to the related art. In FIG. 4, the marginal portions of the unit liquid crystal display panel 10 are ground to have sloped edge portions along upper and lower surfaces. In general, the upper marginal portion of the unit liquid crystal display panel 10 where the shorting bar is formed is ground more than the lower marginal portion of the unit liquid crystal display panel 10.

In order to measure the ground amounts of the unit liquid crystal display panel 10, a camera 60 is installed at an upper side of the marginal portion of the unit liquid crystal display panel 10 to create and image of the upper marginal portion of the unit liquid crystal display panel 10. As the operator inspects the image of the upper marginal portion of the unit liquid crystal display panel 10, the operator may determine whether the ground amount is adequate.

FIG. 5 is a plan view of a photographic image produced by a camera according to the related art. In FIG. 5, an image C1 photographed by the camera 60 (in FIG. 4) shows a grind width W1 of the upper marginal portion of the unit liquid crystal display panel 10. However, the apparatus for measuring the ground amount of liquid crystal display panel has the following problems. First, since the camera 60 (in FIG. 4) is installed at the upper side of the marginal portion of the unit liquid crystal display panel 10, photographic images of only the upper marginal portion of the unit liquid crystal display panel 10 are obtained. Accordingly, photographic images of the lower marginal portion of the unit liquid crystal display panel 10 are not obtained, thereby making it impossible to determine whether the lower marginal portion of the unit liquid crystal display panel 10 has been adequately ground. Thus, the lower marginal portion of the unit liquid crystal display panel 10 may be defective, which would result in a defective liquid crystal display panel and a yield degradation.

SUMMARY OF THE INVENTION

Accordingly, the present invention is directed to an apparatus and method for measuring ground amounts of a liquid crystal display panel that substantially obviates one or more of the problems due to limitations and disadvantages of the related art.

An object of the present invention is to provide an apparatus for measuring ground amounts of upper and lower marginal portions of a unit liquid crystal display panel.

Another other object of the present invention is to provide a method of measuring ground amounts of upper and lower marginal portions of a unit liquid crystal display panel.

Additional features and advantage of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for measuring ground amounts of a liquid crystal display panel includes a grinding unit for grinding upper and lower marginal portions of a unit liquid crystal display panel, a first imaging system for producing images of a ground surface of the upper marginal portion of the unit liquid crystal display panel, and a second imaging system for producing images of a ground surface of the lower marginal portion of the unit liquid crystal display panel.

In another aspect, a system for measuring ground amounts of a liquid crystal display panel includes an imaging system for producing images of ground upper and lower marginal portions of the liquid crystal display panel along the upper and lower marginal portions of the liquid crystal display panel.

In another aspect, a method for measuring ground amounts of a liquid crystal display panel includes grinding upper and lower marginal surfaces of a unit liquid crystal display panel using a grinding unit, and producing images of the ground upper and lower marginal surfaces of the unit liquid crystal display panel using an imaging system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
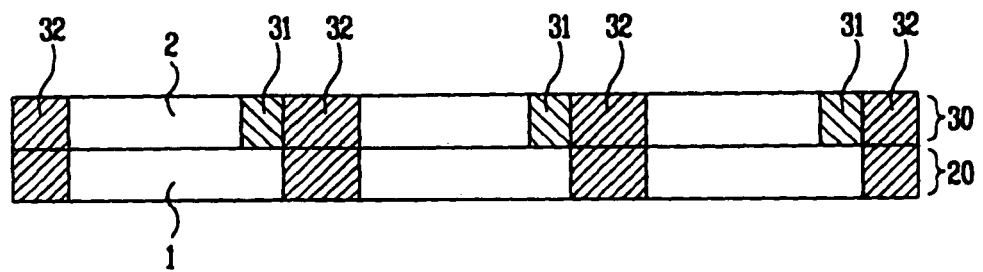
FIG. 1 is a cross sectional view of a plurality of unit liquid crystal display panels according to the related art.
Figure 2:
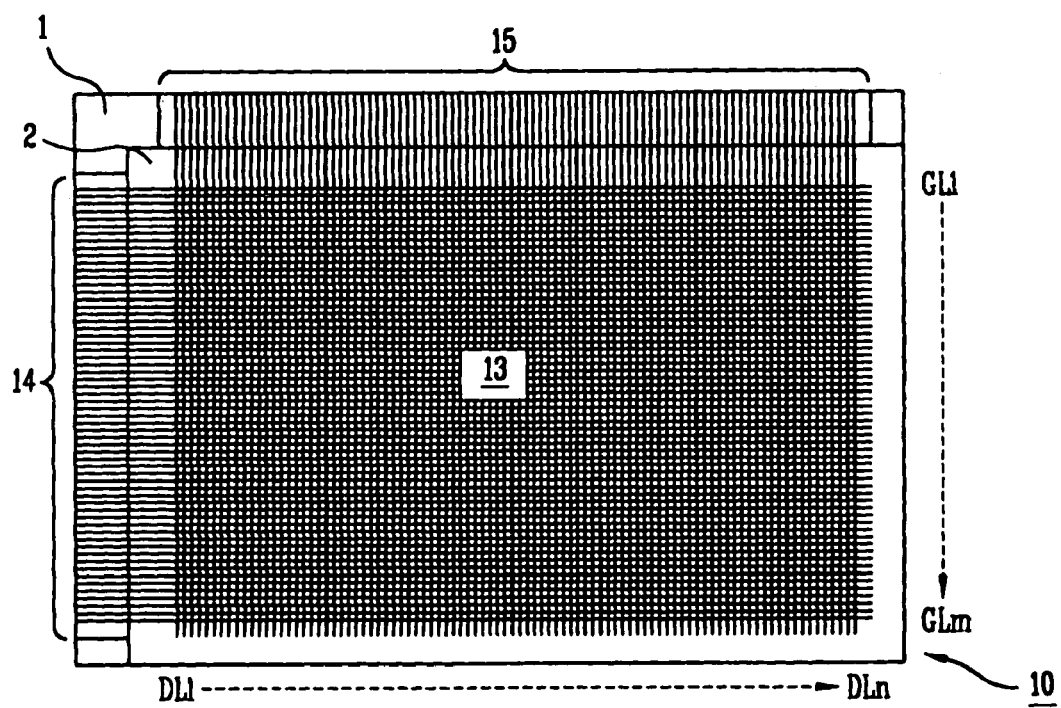
FIG. 2 is a plan view of a unit liquid crystal display panel according to the related art.
Figure 3:
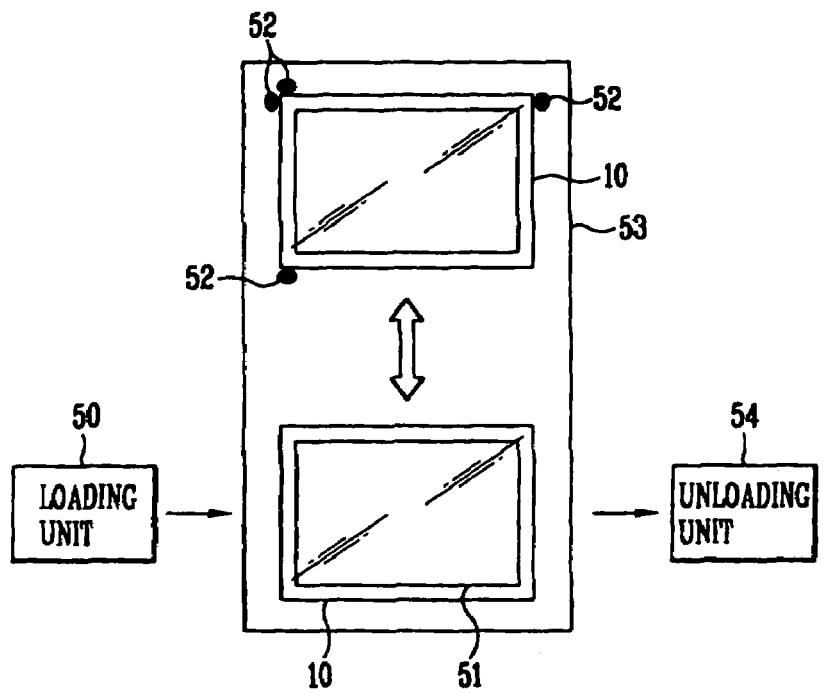
FIG. 3 is a schematic view of a grinding device for a liquid crystal display panel according to the related art.
Figure 4:
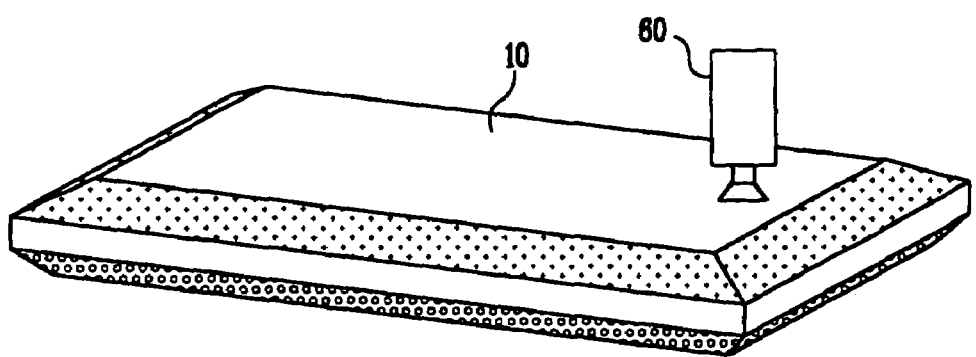
FIG. 4 is a perspective view of an apparatus for measuring a grinding amount of a liquid crystal display panel according to the related art.
Figure 5:
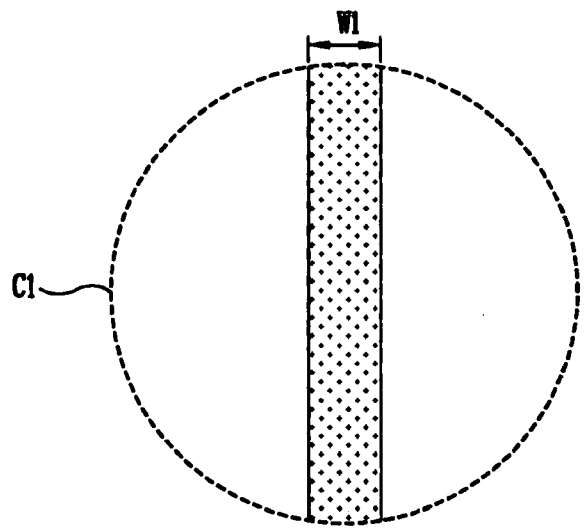
FIG. 5 is a plan view of a photographic image produced by a camera according to the related art.
Figure 6:
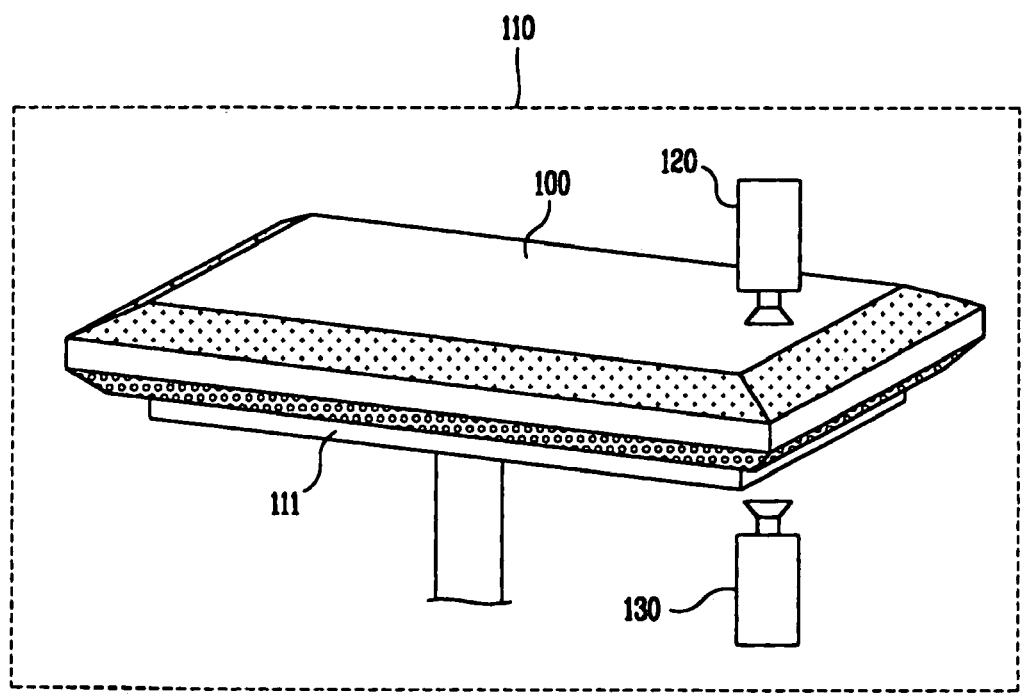
FIG. 6 is a perspective view of an exemplary apparatus for measuring a grinding amount of a liquid crystal display panel according to the present invention.

FIG. 6 is a perspective view of an exemplary apparatus for measuring a grinding amount of a liquid crystal display panel according to the present invention. In FIG. 6, an apparatus for measuring a ground amount of a liquid crystal display panel may include a grinding unit 110 for grinding upper and lower marginal portions of a unit liquid crystal display panel 100, a first imaging system 120 for producing images of a ground surface of the upper marginal portion of the unit liquid crystal display panel 100, and a second imaging system 130 for producing images of a ground surface of the lower marginal portion of the unit liquid crystal display panel 100. The grinding unit 110 may include a grinding table 111 upon which the unit liquid crystal display panel 100 may be loaded, and a plurality of grinding wheels (not shown) for grinding the upper and lower marginal portions of the unit liquid crystal display panel 100.

Although not shown, the unit liquid crystal display panel 100 may be formed as a thin film transistor array substrate and a color filter substrate attached together such that one short side and one long side of the thin film transistor array substrate may protrude compared to sides of the color filter substrate. In addition, an image display part, where a plurality of pixels may be formed in a matrix configuration, may be provided at a region where the thin film transistor array substrate and the color filter substrate are attached together.

A plurality of gate lines, which are arranged along a horizontal direction, and a plurality of data lines, which are arranged along a vertical direction, may be formed to intersect each other at the image display part of the thin film transistor array substrate. Furthermore, a plurality of pixels may be arranged in a matrix configuration at a rectangular region defined at a region where the gate and data lines intersect. The plurality of pixels may individually include a thin film transistor, which may function as a switching device, and a pixel electrode.

The image display part of the color filter substrate may include red, green, and blue color filters formed to be separated by a black matrix and a common electrode, and the counter electrode of the pixel electrode may be formed on the thin film transistor array substrate. The thin film transistor array substrate and the color filter substrate may be attached together using a seal pattern formed along an outer edge of the image display part. Randomly scattered ball spacers or patterned spacers (i.e., column spacers) may be formed using photolithographic processes on the thin film transistor array substrate or on the color filter substrate. Accordingly, the attached thin film transistor array substrate and the color filter substrate may have a certain gap therebetween, wherein a liquid crystal layer may be provided within the gap. The liquid crystal layer may be formed using a vacuum injection method after the thin film transistor array substrate and the color filter substrate are attached together, or dropping liquid crystal material onto at least one of the thin film transistor array substrate and the color filter substrate and attaching the thin film transistor array and color filter substrates together.

Along the protruding short side of the thin film transistor array substrate, a gate pad part may be formed to be electrically connected to the gate lines to supply drive signals to the gate lines. In addition, along the protruding long side of the thin film transistor array substrate, a data pad part may be formed to be electrically connected to the data lines to supply image information to the data lines.

In FIG. 6, upper and lower marginal portions of the unit liquid crystal display panel 100 may be ground to include a sloped edge portion. For example, the upper marginal portion of the unit liquid crystal display panel 100, where the shorting bar may be formed, may be ground more as compared to the lower marginal portion of the unit liquid crystal display panel 100.

The first and second imaging systems 120 and 130 may be positioned along the upper and lower marginal portions of the unit liquid crystal display panel 100, respectively. For example, either one or both of the first and second imaging systems 120 and 130 may include a charge coupled device (CCD) to produce images of the upper and lower marginal portions of the unit liquid crystal display panel 100. The first and second imaging systems 120 and 130 may be aligned to the upper and lower marginal portions of the unit liquid crystal display panel 100, respectively, using an alignment mark (not shown) that may be provided at the upper and lower marginal portions of the unit liquid crystal display panel 100. Then, an image of the ground surfaces of the upper and lower marginal portions of the unit liquid crystal display panel 100 may be used to measure ground amounts of the upper and lower marginal portions of the unit liquid crystal display panel 100.

For example, the first and second imaging systems 120 and 130 may produce images along the upper and lower marginal portions of the unit liquid crystal display panel 100 to be used to measure the ground amounts. Alternatively, the first and second imaging systems 120 and 130 may produce images of the ground surfaces of the upper and lower marginal portions of the unit liquid crystal display panel 100 at one or more positions of the upper and lower marginal portions of the liquid crystal display panel 100 to be used to measure the ground amounts.

As the grinding table 111 of the grinding unit 110 rotates and moves, the first imaging system 120 may produce images at a predetermined position, or predetermined positions, of the upper surface of the unit liquid crystal display panel 100 to be used to measure ground amounts of the upper surface of the unit liquid crystal display panel 100. In addition, the second imaging system 130 may produce images at the predetermined position(s) of the lower surface of the unit liquid crystal display panel 100 to be used to measure the ground amounts. Accordingly, additional processes to correct grinding amounts of the lower surface of the unit liquid crystal display panel 100 may not be necessary.

Figure 7A:
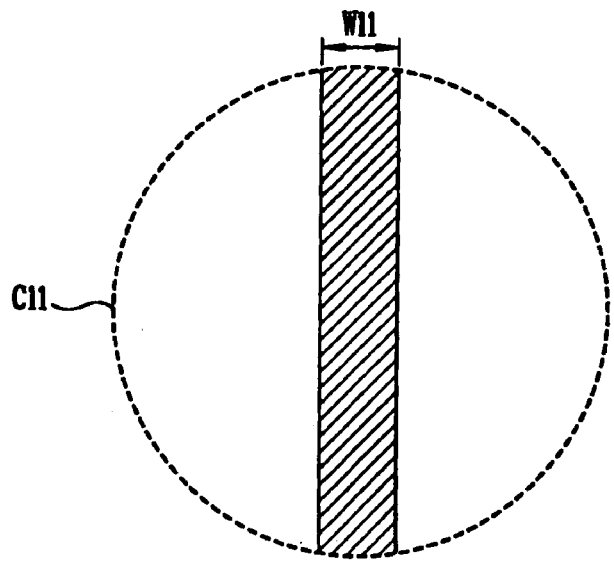
FIGS. 7A and 7B are plan views of photographic images produced by first and second imaging systems of FIG. 6 according to the present invention.
Figure 7B:
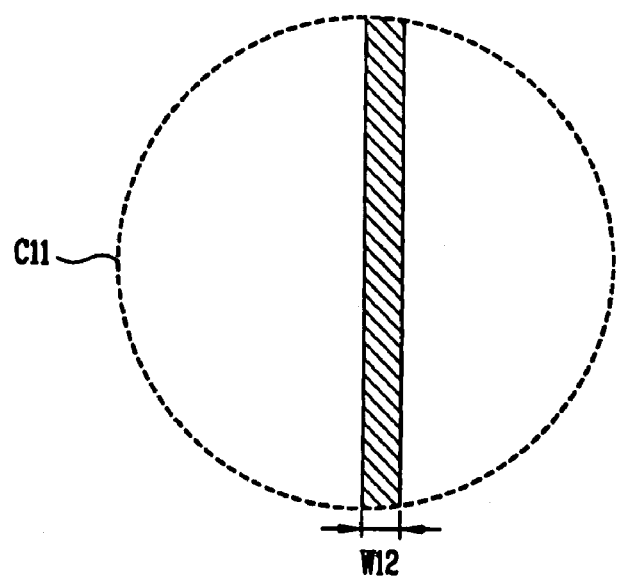

FIGS. 7A and 7B are plan views of photographic images produced by first and second imaging systems of FIG. 6 according to the present invention. In FIGS. 7A and 7B, an image C11 produced by the first imaging system 120 may show a ground width W11 of the upper marginal portion of the unit liquid crystal display panel 100, while an image C12 produced by the second imaging system 130 may show a ground width W12 of the lower marginal portion of the unit liquid crystal display panel 100. For example, the upper marginal portion of the unit liquid crystal display panel 100 where the shorting bar may be formed may be ground more as compared to the lower marginal portion of the unit liquid crystal display panel 100. Accordingly, the ground width W11 of the upper marginal portion of the unit liquid crystal display panel 100 may be wider than the ground width W12 of the lower marginal portion of the unit liquid crystal display panel 100.

Thus, the operator may detect the ground amounts of the upper and lower marginal portions of the unit liquid crystal display panel 100 from the images C11 and C12 produced using the first and second imaging systems 120 and 130. If defective grinding is performed, the ground amounts of the upper and lower marginal portions of the unit liquid crystal display panel 100 may be corrected by suitably controlling the grinding wheels (not shown) that may be provided within the grinding unit 110.

It will be apparent to those skilled in the art that various modifications and variations can be made in the apparatus and method for measuring ground amounts of a liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A method for measuring ground amounts of a liquid crystal display panel, comprising:

grinding upper and lower marginal surfaces of a unit liquid crystal display panel using a grinding unit to include a sloped edge portion, wherein the unit liquid crystal display panel includes a thin film transistor array substrate and a color filter substrate;

producing first images of the ground surface of the upper and marginal surface of the unit liquid crystal display panel using a first imaging system; and producing second images of the ground surface of the lower marginal surface of the unit liquid crystal display panel using a second imaging system, wherein the upper marginal surface of the unit liquid crystal display panel is grinded more as compared to the lower marginal surface of the unit liquid crystal display panel.

2. The method according to claim 1, further comprising:

loading the unit liquid crystal display panel upon a grinding table of the grinding unit; and grinding the upper and lower marginal surfaces of the unit liquid crystal display panel using a plurality of grinding wheels.

3. The method according to claim 1, wherein the first and second imaging systems are provided within the grinding unit.

4. The method according to claim 1, wherein the first and second imaging systems include at least one charge coupled device (CCD).

5. The method according to claim 1, further comprising aligning the first and second imaging systems with the upper and lower marginal surfaces of the unit liquid crystal display panel using an alignment mark provided at the upper and lower marginal surfaces of the unit liquid crystal display panel.

6. The method according to claim 1, wherein producing first and second images includes producing the first and second images of the ground upper and lower marginal surfaces of the unit liquid crystal display panel using the first and second imaging systems.

7. The method according to claim 1, wherein producing first and second images includes producing the first and second images of the ground upper and lower marginal surfaces of the unit liquid crystal display panel at one or more positions of the upper and lower marginal surfaces of the unit liquid crystal display panel using the first and second imagine systems.

8. A liquid crystal display panel having measured ground upper and lower marginal surfaces measure using the method according to claim 1.

* * * * *